United States Patent [19]
Hess

[11] Patent Number: 6,049,273
[45] Date of Patent: Apr. 11, 2000

[54] CORDLESS REMOTE ALARM TRANSMISSION APPARATUS

[75] Inventor: Brian K. Hess, Westerville, Ohio

[73] Assignee: Tattletale Portable Alarm, Inc., Columbus, Ohio

[21] Appl. No.: 09/116,149

[22] Filed: Jul. 15, 1998

Related U.S. Application Data

[63] Continuation-in-part of application No. 08/887,212, Jul. 2, 1997, Pat. No. 5,850,180, which is a continuation-in-part of application No. 08/717,569, Sep. 23, 1996, Pat. No. 5,777,551, which is a continuation-in-part of application No. 08/303,950, Sep. 9, 1994, Pat. No. 5,587,701.

[51] Int. Cl.⁷ .............................. G08B 1/08; H04M 11/04
[52] U.S. Cl. ...................... 340/539; 340/531; 340/691.1; 340/693.5; 340/331; 379/37; 379/40
[58] Field of Search ...................................... 340/539, 531, 340/689, 691.1, 693.5, 692, 331, 332; 379/37, 38, 40

[56] References Cited

U.S. PATENT DOCUMENTS

| | | | |
|---|---|---|---|
| 3,925,763 | 12/1975 | Wadhwani et al. | 340/539 |
| 4,446,454 | 5/1984 | Pyle | 340/521 |
| 4,540,977 | 9/1985 | Taillens et al. | 340/552 |
| 4,742,336 | 5/1988 | Hall et al. | 340/539 |
| 4,797,657 | 1/1989 | Vorzimmer et al. | 340/541 |
| 4,943,799 | 7/1990 | Papineau | 340/521 |
| 4,951,029 | 8/1990 | Severson | 340/531 |
| 5,200,735 | 4/1993 | Hines | 340/539 |
| 5,257,007 | 10/1993 | Steil et al. | 340/539 |
| 5,283,549 | 2/1994 | McHaffey et al. | 340/521 |
| 5,463,595 | 10/1995 | Rodhall et al. | 340/426 |

FOREIGN PATENT DOCUMENTS

| | | |
|---|---|---|
| 2036560 | 8/1992 | Canada . |
| 2 194 119 | 7/1986 | United Kingdom . |

*Primary Examiner*—Donnie L. Crosland
*Attorney, Agent, or Firm*—Standley & Gilcrest LLP

[57] ABSTRACT

A portable alarm system in which the alarm functions are contained within a portable enclosure, communication is maintained between the alarm system and wireless security devices, and the alarm is capable of initiating a telephone call to a security monitoring station either by conventional hard-wired telephone lines by cellular transmission, by 1900 megahertz PCS or by other wireless technology. The system may include a wireless/cordless line seizure feature to use a nearby landline if the system is plugged into a landline that has been disabled. The system may also include a vibration/shock sensor to activate the alarm functions if the portable unit is moved or attempted to be destroyed by an intruder.

11 Claims, 9 Drawing Sheets

FIG-1

FIG-2 CELLULAR MODEL

FIG-7 CELLEMETRY MODEL

PCS MODEL
FIG-9

CORDLESS REMOTE ALARM TRANSMISSION APPARATUS

This is a continuation-in-part application of U.S. patent application Ser. No. 887,212 filed on Jul. 2, 1997 now U.S. Patent No. 5,850,180, which is a continuation-in-part of U.S. patent application Ser. No. 717,569 filed on Sep. 23, 1996 now U.S. Pat. No. 5,777,551, which is a continuation-in-part of U.S. patent application Ser. No. 303,950 filed on Sep. 9, 1994 now issued U.S. Pat. No. 5,587,701.

BACKGROUND AND SUMMARY OF THE INVENTION

The present invention relates generally to alarm systems, and more particularly, to a portable alarm system for use in a residence, boat, office, or any other structure which may benefit from security monitoring.

Alarm systems of various types have been in existence for many years. In known home alarm systems, the components are usually hard-wired throughout a home with the wiring usually terminating at a control panel located somewhere within the home. One of the chief drawbacks of such a system is that the alarm system is permanently installed in the home which offers little or no value to the original purchaser of the alarm system when he or she moves from the home. Furthermore, the installation of such an alarm system is labor intensive and, therefore, costly. The present invention may perform all the functions found in traditional home alarm systems as well as additional new functions. Furthermore, the present invention is easily portable (i.e., able to be carried in one hand by an adult or teenager), externally wireless in one embodiment, capable of placing a call without direct connection to a telephone line, and resistant to shock.

The present invention comprises a portable alarm apparatus that incorporates wireless alarm sensing technology along with wireless/cordless telephone service technology, for example, to provide a unique and effective deterrent to illegal entry. The preferred embodiment of the present invention is capable of sounding a high-decibel alarm, actuating a strobe light and contacting a security monitoring station via cellular or other wireless telephonic transmission technology. The present invention may be equipped to monitor door and window entries and has the ability to sense motion within a room with a preferred motion detector. The present invention may also be equipped with a smoke detector and transmitter for communicating in a wireless manner with the microprocessor of the present invention. The present invention is the only alarm system currently known which offers the following preferred features:

1) is portable;
2) offers wireless alarm sensing connections to doors, windows, smoke detectors, motion detectors, necklaces, pendants, etc.;
3) may incorporate cellular, Cellemetry, PCs, cordless or other wireless telephonic technology;
4) is substantially contained in a single, unique, shock-proof enclosure that is small enough to be easily transported by hand from place to place;
5) may be used as a substitute for a traditional hard-wired home alarm system;
6) may be operated from an AC outlet;
7) may be interfaced to a transmitter for making a call over a control channel of a cellular telephone system, or by means of 1900 megahertz PCs or via a landline (either the landline of the secured premises or the landline of nearby premises);
8) may include a latch key function to alert when children arrive home;
9) may include a continuous strobe light and/or siren that warns of a break-in so the consumer knows not to enter the premises;
10) may include a battery back-up (to assure calls are completed to the monitoring station);
11) may be interfaced to a surveillance camera;
12) may include a cordless feature which is adapted to utilize a nearby available dial tone line, if the dial tone line to the protected premises has been cut; and
13) may include a vibration/shock sensor for the enclosure which is adapted to detect any movement of the enclosure to activate its alarm functions.

Home alarm systems are frequently connected to the home's telephone wiring system to automatically place a call to a monitoring station at some distance away from the home to warn those at the monitoring station that a possible illegal entry has occurred. This, in theory, enables those at the monitoring station to either send a security officer to the home or place a call to the police to initiate inspection of the home where the alarm was activated. A drawback of this type of system is that sophisticated burglars are knowledgeable of such systems and will cut the telephone wires prior to entry into the home, thereby rendering the alarm system useless (because when the illegal entry occurs, the system will not function to place the automatic call to the security monitoring station). The present invention solves this problem by providing wireless/cordless phone transmission. Additionally, the wireless/cordless communication means is enclosed within the alarm system enclosure and is adapted to run off the power supplied by an AC outlet or a backup power source within the enclosure.

Thus, the present invention makes a significant contribution to the art by being the first wireless, wireless alarm system made portable. The first "wireless" is in reference to the fact that the present invention does not require connecting wires from the alarm sensing devices to the alarm system portable enclosure, to be operational. The second "wireless" is in reference to the fact that the invention may be cellular or other wireless/cordless communication. The integration of these two "wireless" features into a small, easily portable, enclosure is unique and provides a very beneficial product to consumers.

The present day security alarm system market offers few alternatives for the millions of citizens that live in apartments (where they are unlikely to spend significant amounts of money to install a permanent, hard-wired, alarm system when they may not be living in the apartment for more than a relatively short amount of time), a hotel room, a leased office space, short term warehousing, motor homes, construction trailers, and a multitude of other environments in which a person would not intend to stay for a relatively long period of time and thus would not wish to invest a significant expense in a permanent alarm system. It is exactly these environments where crime is often the highest. Therefore, a need exists for an alarm system that is portable, which is relatively inexpensive, which is easy to use, and which does not have to rely on a building's installed telephone lines or power lines.

The present invention preferably comprises a portable enclosure; a microprocessor installed within the enclosure; a wireless receiver installed within the enclosure and electrically connected to the microprocessor for receiving alarm signals from intruder sensing devices; a wireless/cordless communications means, in electric communication with the microprocessor, for initiating a telephone call to a location away from the place in which the alarm system is located; an interface keypad panel in electric communication with the microprocessor for programming the alarm system according to specific user needs.

It is also preferred that the portable alarm system be comprised of a shock-proof construction comprising reinforced ribbing in an injection molded plastic enclosure. Within the enclosure, a vibration/shock sensor may be electrically connected to a control panel. The vibration/shock sensor detects movement of the portable enclosure (such as a burglar's attempt to destroy, remove or pick-up the portable enclosure) and actuates the control panel to active the alarm features of the present invention, including calling the monitoring station. In this respect, if a burglar attempts to defeat the invention by crushing it, the present invention will withstand physical shocks and perform its intended functions.

It is also preferred that the alarm system of the present invention be further comprised of: a motion sensor electrically connected to the microprocessor for detecting intrusion into the protected area; an LED board electrically connected to the microprocessor for indicating the current status of the alarm system; an audio siren electrically connected to the microprocessor; a strobe light electrically connected to the microprocessor; a back-up power source or battery electrically connected to the microprocessor for providing back-up power to the microprocessor; a surveillance camera electrically connected to the microprocessor and secured within the enclosure for visually monitoring the premises and transmitting a picture or series of pictures to a monitor station.

1.) It is also preferred that the portable alarm of the present invention be adapted to initiate a call over a control channel of a cellular phone system or 1900 Mhz PCs or over a landline at a nearby location via wireless/cordless technology.

The vibration/shock sensing device allows the actuation of the alarm and/or actuation of dial-up procedures upon the displacement of the alarm system. This feature may for example, be used where a burglar attempts to smash or break the alarm system to prevent operation.

The wireless/cordless dial-tone transmission capability allows the unit to separate the dialing and alarm signal transmission functions from the alarm unit. Thus, the remote transmitter for dialing and transmitting the alarm signals may continue to function despite any attempts to disable the alarm unit itself (e.g., throwing it against the wall).

DETAILED DESCRIPTION OF THE PREFERRED EMBODIMENT(S)

Figure 1:
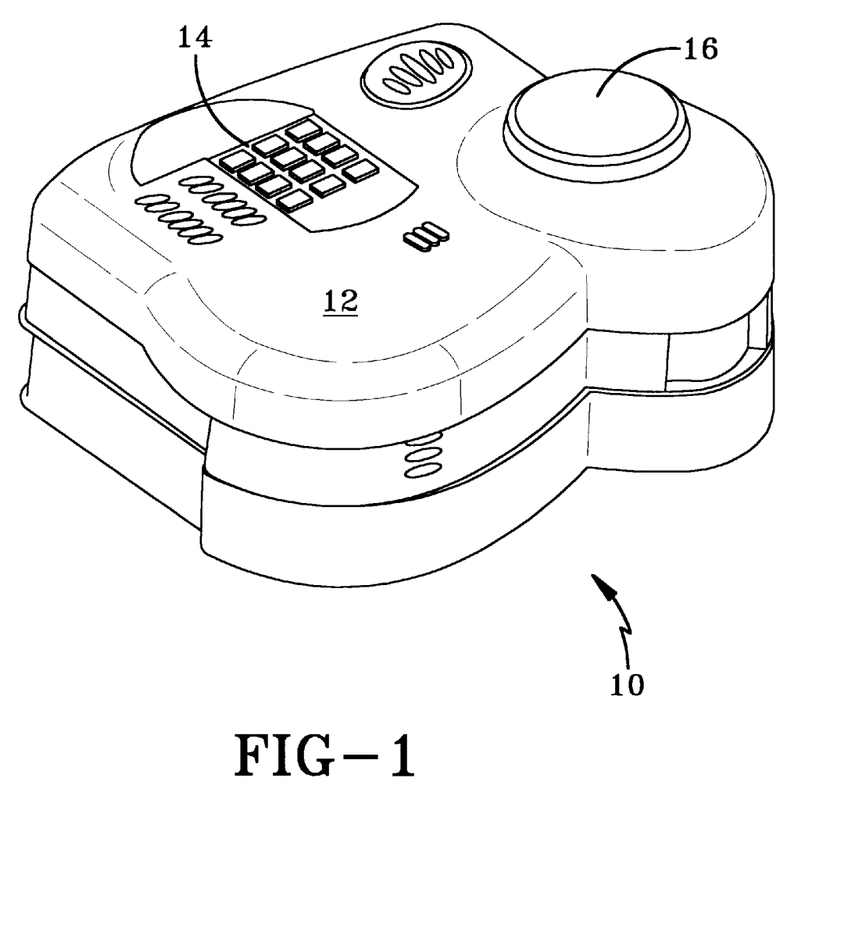
FIG. 1 is a perspective view of one embodiment of the present invention.

Novel features and advantages of the present invention, in addition to those mentioned above, will become apparent to those skilled in the art from a reading of the following detailed description in conjunction with the accompanying drawings, wherein similar reference characters refer to similar parts and in which:

FIG. 1 is a perspective view of one embodiment of the present invention. The portable alarm system 10 is contained in a portable enclosure 12. A keypad, i.e. an interface keypad panel 14, interfaced with the microprocessor 20, can be used to program the alarm system 10 according to specific user needs. A strobe light 16 is preferably contained in the enclosure 12.

Figure 2:
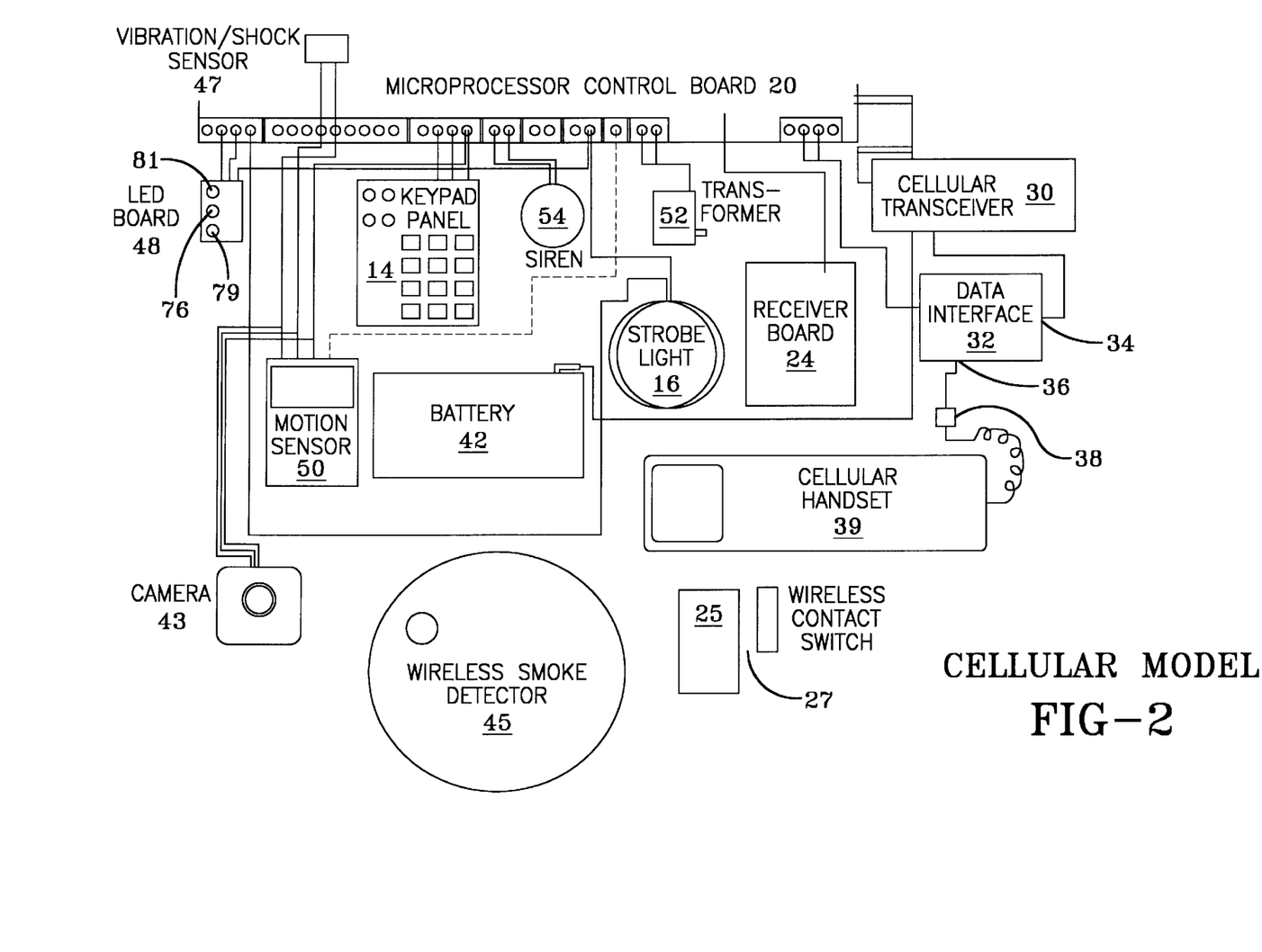
FIG. 2 is a schematic of one embodiment of the present invention interfaced with cellular functionality.

FIG. 2 is a schematic of the present invention interfaced with cellular functionality. In the preferred embodiment, the alarm of the present invention is comprised of:

a keypad panel 14;

a strobe light 16;

a microprocessor control board 20;

a receiver board 24;

a data interface 32;

a cellular transceiver 30 and handset 39;

a battery 42;

a wireless smoke detector 45;

an LED board 48;

a motion sensor 50; and a transformer 52.

Wireless security contact switches 25, or other deviation sensing devices, are placed on doors, windows, etc. of the residence to be secured. If a door or window is opened while the alarm 10 is set, the alarm 10 will be activated. The breaking of the switch connection 27 at the security contacts 25, at the point of entry or other secured zone, causes a signal to be received at the wireless receiver 24. Once the intruder signal has been received by the receiver 24, the microprocessor 20 will send appropriate signals which activate the audio siren 54, the strobe light 16, and the cellular phone, etc., which places a call to a security monitoring station.

FIG. 2 depicts the elements of the alarm system 10 that may be contained in the portable enclosure 12. The alarm system 10 is controlled by the microprocessor 20. The microprocessor 20 is a microcomputer based control panel. In one embodiment, the alarm microprocessor 20 is a commercially available microprocessor alarm board that may be supplied by any of a number of alarm board suppliers in the alarm industry. In the preferred embodiment, the microprocessor 20 is connected to a power transformer 52 to provide current to the microprocessor 20 from a source such as a conventional wall outlet. The microprocessor 20 processes the data received at its various inputs and sends appropriate signals to the other components of the alarm system 10, according to the received inputs discussed in further detail below.

The keypad panel 14, is electrically connected to the microprocessor 20. The keypad panel 14 is used to program the alarm system 10 according to specific user needs. In the preferred embodiment, the keypad panel 14 is capable of multiple user codes which may be inputted to arm/disarm the alarm system 10. Additionally, the keypad panel 14 may be used to activate a Panic/Ambush feature which allows the user to activate the alarm sequence (e.g. activate the siren 54, strobe light 16, and call) by the push of one or two buttons. This feature may be remote from the keypad panel 14, such as by a remote panic button worn on a necklace.

The keypad panel 14 may also be used to send a silent distress signal by actuating predetermined code numbers on the keypad panel 14. The keypad panel 14 also allows the user to program, and configure, the alarm system 10 based on individual user needs. For example, the user may program the alarm system 10 to monitor or bypass all or specific intruder zones, discussed in more detail below, or program specific call parameters.

The AC inputs of the microprocessor 20 are preferably wired to a transformer 52 that may be connected to an AC outlet. The interface keypad panel 14 is preferably wired to the clock, data, and communications inputs of the microprocessor 20.

As discussed, the wireless receiver 24 is installed within the enclosure 12 and electrically connected to the microprocessor 20. The receiver 24 receives alarm signals from wireless devices which may be placed at doors, windows, or any other aperture to be monitored. These intruder sensing devices are comprised of transmitters which send signals (such as report zone status and supervision information) to the wireless receiver 24.

A communications means capable of initiating a telephone call to a location away from the place in which the alarm system 10 is located, such as a security monitoring station, is also preferably contained in the enclosure. In one embodiment, the telephone connection is through a standard telephone jack located on the premises being secured. In another (preferred) embodiment, the communication means is a cellular phone. The cellular phone is a transmitter and receiver. When the phone is on, an antenna is the part of the phone that sends and receives radio frequency energy. In this embodiment, the phone operates in the frequency range of 824 mhz to 894 mhz and employs commonly used frequency modulation techniques. The phone may transmit at a power level that can range from 0.005 to 3 watts. When instructed by the microprocessor 20, the phone will place a call to the monitoring station (e.g. when an alarm has been detected). A call may also transmit data to inform of certain conditions, such as a low battery condition in the alarm system 10. The phone may also be used as another means of ordinary non-emergency communication (e.g. as a regular cellular phone).

When cellular technology is incorporated, a cellular data interface unit 32 is electrically connected to the transceiver 30 to formulate a "tip and ring," which is commonly associated with a dial tone on standard telephone systems. The tip and ring is initiated by the cellular transceiver 30 and a call goes out to a cell site. From the cell site, a signal is sent to a mobile telephone switching office (MTSO). From the MTSO, the call is typically forwarded to the land line telephone company and from there to its final destination (e.g.—the security monitor station or 911 office). The cellular data interface unit 32 is preferably connected to the cellular transceiver 30 out of the RJ45 jack on the side of the cellular data interface unit 32 at 34. The RJ45 jack, at 36, connects to the RJ45 receptacle 38 on the back of the alarm 10. A cellular handset 39 may be plugged into this receptacle 38, allowing the alarm system 10 to be used as a regular cellular telephone. This is advantageous since the alarm system 10 may be used to make telephone calls independent of the functioning of the alarm system 10. By plugging a cellular handset 39 into the alarm 10, specifically in the receptacle at 38, any type of phone call may be made, social or business, via the alarm system 10. Thus, if the alarm system 10 is taken to secure a vacation cabin home for a weekend in the mountains, the alarm system 10 may also be used with a cellular handset 39 to make desired phone calls.

A battery 42 acts as a back-up power supply to the transformer 52. It may be recharged by receiving a trickle charge from the transformer 52.

A vibration/shock sensor 47 may be electrically connected to the control board. When the apparatus 10 is moved by an intruder, the sensor 47 actuates the alarm functions described herein (e.g., siren, strobo, etc.) and actuates the means for making a call to a monitoring station.

The motion sensor 50 is preferably a combination passive infrared sensor (PIR) and microwave sensor; both contained in a single device. The motion sensor 50 will send an activation signal to the microprocessor 20 when both infrared and microwave sensors detect intrusion at the same time. The PIR operates by detecting a rapid change in temperature when an intruder crosses a protected area. When a beam emanating from the sensor 50 experiences a change in heat (projected back through a lens in the sensor) a pulse is generated by the sensor element. The microwave transmitter sends out a short burst of radio frequency energy and the receiver detects changes in the returned signal caused by motion within the covered area.

The motion sensor 50 is preferably wired to appropriate input locations, i.e. communications terminals, on the microprocessor 20. The microprocessor 20 is programmed to recognize the input signals from the motion sensor 50 and to activate the subsequent alarm signals. Motion sensors 50 may be purchased from a variety of manufacturers. A preferred range for the motion detector would be sufficient to adequately cover the area of a large room, preferably out to a 45 foot range, at 90 degrees, from the location of the motion sensor 50.

The invention may also include a miniature surveillance camera 43. One such camera 43 is available from TVX, Inc., model TVX-01, in Broomfield, Colo. The camera 43 is electrically connected to the microprocessor 20.

When the alarm system 10 is armed, a violation of the protected area will send a message to the microprocessor 20. Upon receiving a signal indicating a violation has occurred, the microprocessor 20 will activate the siren 54 and the strobe light 16 along with placing the call to the monitoring station. The audio siren 54 and strobe light 16 are used as audible and visual deterrents. The strobe light 16 flashes a bright light, preferably at a rate of 60 to 100 pulses per minute, for example.

Preferably, the strobe light 16 remains flashing after the alarm system 10 has reset. The user/owner of the alarm 10 may be required to turn off the strobe 16. In this way, the strobe 16 may be programmed to stay on to warn the user/owner upon returning to the residence that a break-in has occurred. The strobe 16 remains flashing after a break-in with either the AC power source 52 or battery 42 back-up supplying power to the strobe 16. The siren 54 preferably produces a loud warble tone at 82 to 115 dBa at a frequency of 2900+/−500 Hz, for example. The audio siren 54 is preferably flush-mounted to a surface of the enclosure body 64. The strobe light 16 and siren 54 are both wired to appropriate output terminals on the alarm control panel 20 which provide sufficient signals to drive the devices.

A preferred wireless smoke detector 45 communicates to receiver 24. The detector 45 is adapted to actuate receiver 24 to contact the monitoring station which complies with commercial fire code standards. The camera lens 43 is connected to the microprocessor board 20.

The interface keypad panel 14 may also be used to activate/deactivate the audio siren 54, to program the telephone number of a security monitor station into the alarm system 10, and to enter a user code that would enable the owner of the alarm system 10 to activate/deactivate the device during a predetermined time upon exit/entry into and out of the alarm 10 owner's residence.

The alarm system 10 may be programmed through the keypad panel 14 to interact with different intruder zones within a secured residence. For example, zone 1 may be the front door of a residence. Zones 2, 3, and 4 may be specific windows of the residence. The alarm system 10 may be programmed, for example, to have a delay of 30 seconds at zone 1, and no delay at zones 2–4. With no delay, the alarm system 10 would preferably be instantly activated once an illegal entry has been made.

Figure 3:
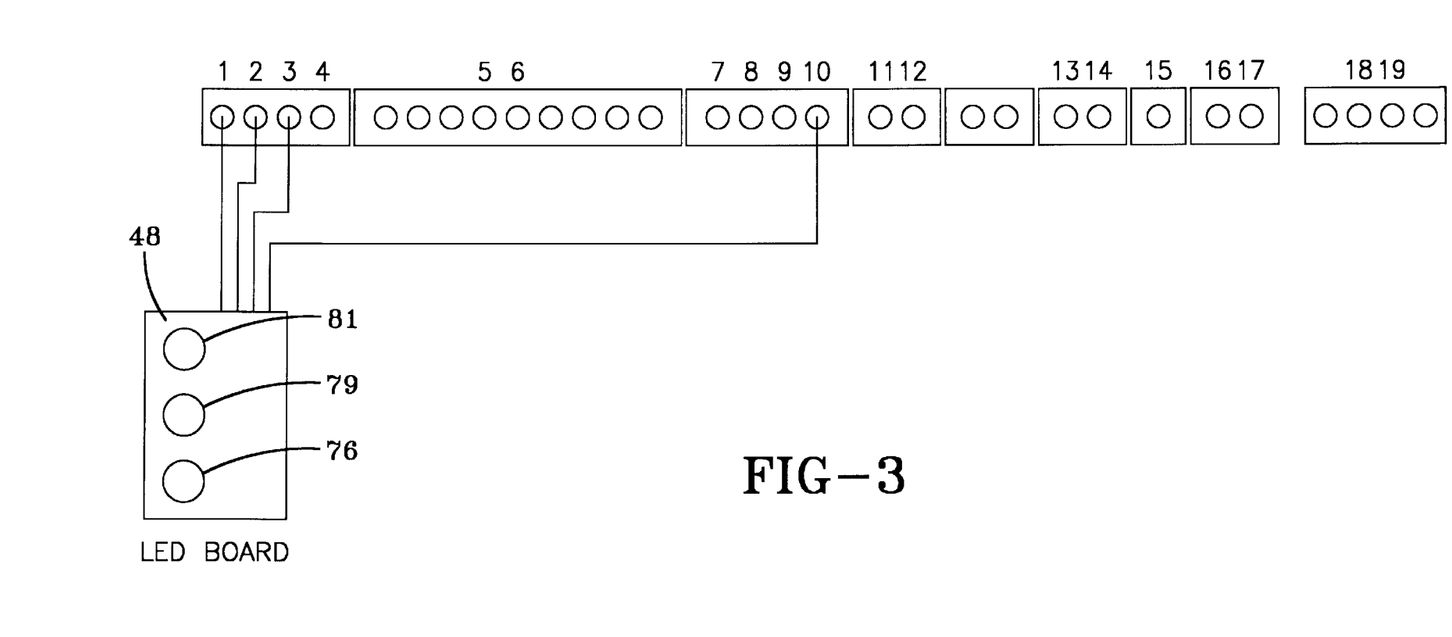
FIG. 3 is a schematic of a preferred LED board of the present invention.

The LED board 48 is preferably used to display different types of status signals, based on the status of the system 10. The first status LED 81, preferably, emits a steady red light when AC power is present or a flashing red light when the battery is low. The power indicator 81 provides information on the status of the power sources available to the alarm system 10. The power indicator 81 will turn off when complete power to the system 10 is absent.

The second status LED 79, preferably, emits a red light when the alarm system 10 has been armed or a flashing red light when the instant arming feature has been activated (instant arming means that a trip signal from any of the zones will cause an alarm instantly without any delay time).

The third status LED 76, preferably, emits a steady green light to indicate that a call is being transmitted to a monitoring station. (FIG. 3 is a schematic of one embodiment of the LED board 48.) The LED board 48 is preferably wired to auxiliary output terminals of the microprocessor 20.

Figure 5:
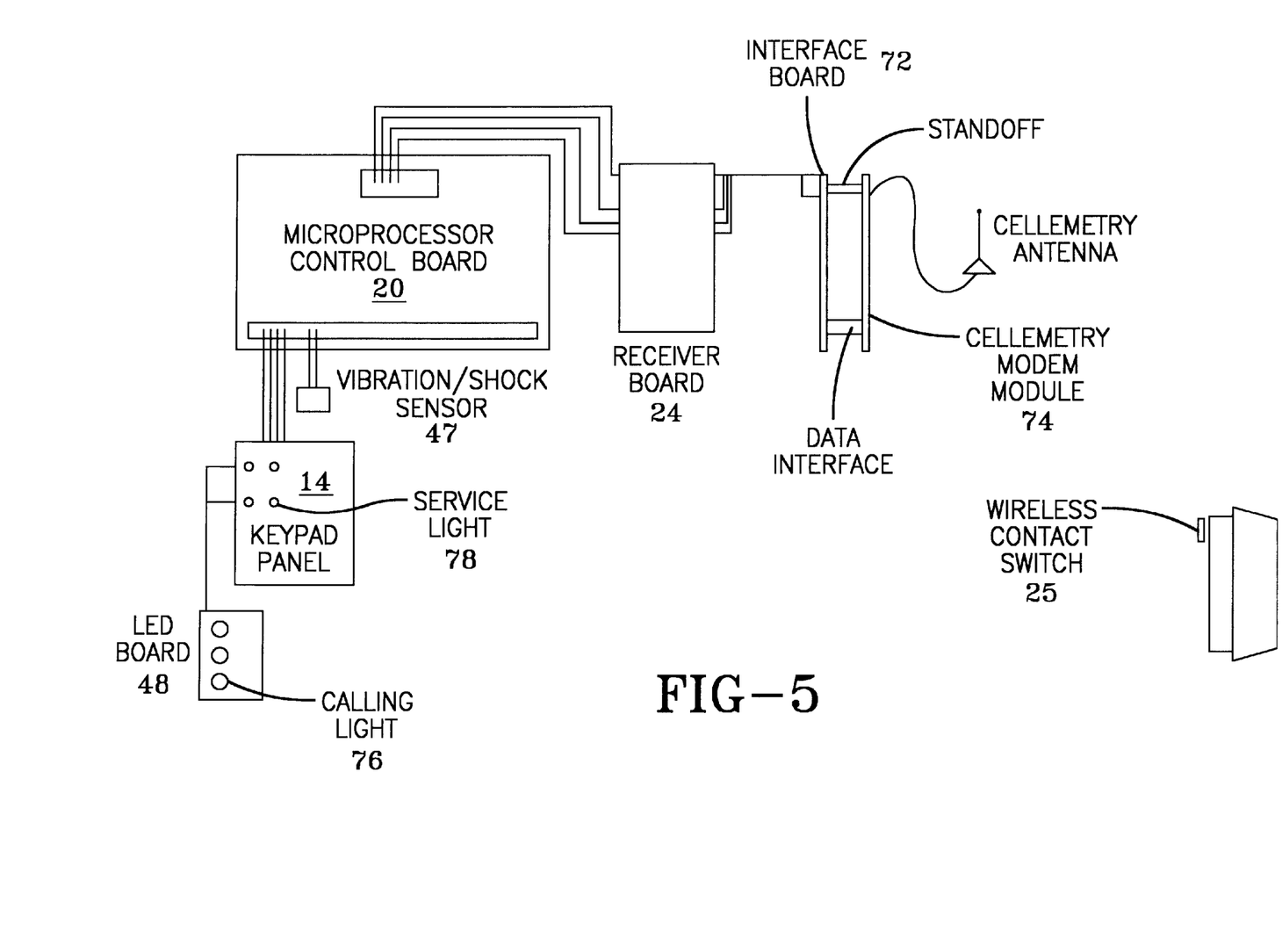
FIG. 5 is a schematic of a second embodiment of the present invention interfaced with Cellemetry functionality.

FIG. 5 illustrates another embodiment of the present invention. FIG. 5 illustrates a schematic of a portable alarm system 10 that uses Cellemetry technology for converting alarm protocol into cellular data signals.

Cellemetry represents the marriage of cellular telephone service and telemetry. It provides a relatively inexpensive and reliable method of transmitting and receiving packets of critical information (or data), employing existing, yet underutilized, radio channels. To enable such technologies an MTSO (mobile telephone switching office) serves as a gateway to the Cellemetry system.

Every cellular phone system has voice channels for traditional communication and control channels which handle the administrative overhead of the cellular system, such as collecting customer calling information. Due to cellular technologies, the control channel is utilized only a small fraction of the time (10% usage) leaving it available for other tasks—provided that these other tasks do not interfere with the primary functions (or regular cellular activity, non-Cellemetry) of that channel (however, a control channel is rarely ever occupied for more than a few seconds due to primary function allocations).

Cellemetry technology, in essence, mimics a "roaming" mobile telephone. During a roaming setup sequence, a registration process takes place in which the cellular system verifies that the unit attempting to make the calls is valid. Each cellular system sends a message at regular intervals to all of the "roamers" operating in its system, telling them how to operate as a roamer. One of the requirements as a roamer is to autonomously register (AR), during which time the cellular telephone reports its mobile identification number (MIN) and electric serial number (ESN) to the cellular system via the Reverse Control Channel. The cellular system processes these signals and routes them, via a special network, back to the cellular customer's home cellular system which validates the customer's identity and provides all of the customer's calling features. The MINs are specially assigned so that the Cellemetry calls are routed only to the Cellemetry gateway. These signals may be used by the portable alarm system 10 of the present invention to alert a monitor station of intruder entry, etc.

The Cellemetry gateway at the central station processes the messages and passes them on to be processed according to the caller's unique features.

As discussed, FIG. 5 illustrates a schematic of one embodiment of the portable alarm system 10 of the present invention which utilizes Cellemetry technology. A wireless security contact 25 sends an intruder signal once a zone being monitored is breached. A wireless receiver 24 receives the intruder signal and takes appropriate action as discussed above, e.g. activating the alarm 10. The wireless receiver 24 transmits alarm protocol to the Cellemetry interface 72 which converts the alarm protocol into cellular data. In another embodiment, the processor 20 may develop the protocol for the alarm signal which is sent to the Cellemetry interface 72. Accordingly, the interface 72 acts to convert signals, which indicate a zone has been actuated, to a radio signal for transmission over the control channel of the cellular phone system.

The Cellemetry Modem Module 74 transmits and receives cellular data as it is commanded by the interface 72. The Cellemetry Modem Module 74 sends the signals, as discussed above, which the Cellemetry system processes and routes. Accordingly, alarm signals from particular portable alarm systems may be sent via the control channel and identified and processed for appropriate action.

In the embodiment shown in FIG. 5, the calling light 76 is connected so as to emit when a call is being transmitted to the monitoring center. These LEDs 48 are actuated by the control signals of the particular processor 20 used to control the alarm system 10 of the present invention.

Figure 6:
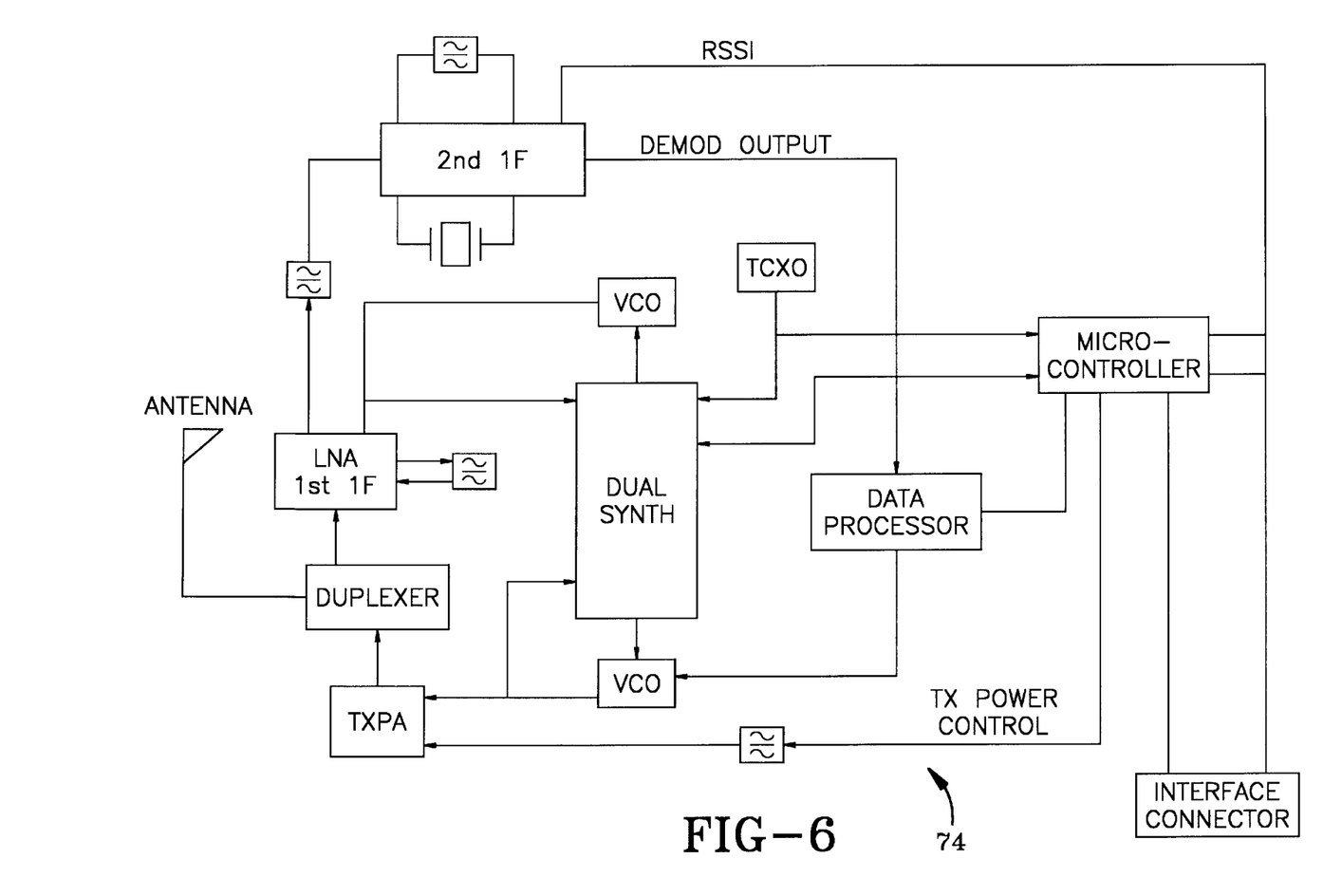
FIG. 6 is a circuit schematic of one example of a Cellemetry Modem Module.

The Cellemetry Modem Module 74 may be an off-the-shelf product. For example, Standard Communications produces a Cellemetry Modem Module (CMM) 74 which may be interfaced to the portable alarm system 10 of the present invention to provide enhanced and flexible portable alarm monitoring features. The Cellemetry Modem Module 74 should support the subscriber unit radio transceiver requirements for the Cellemetry system. FIG. 6 illustrates one embodiment of a Cellemetry Modem Module 74.

Figure 7:
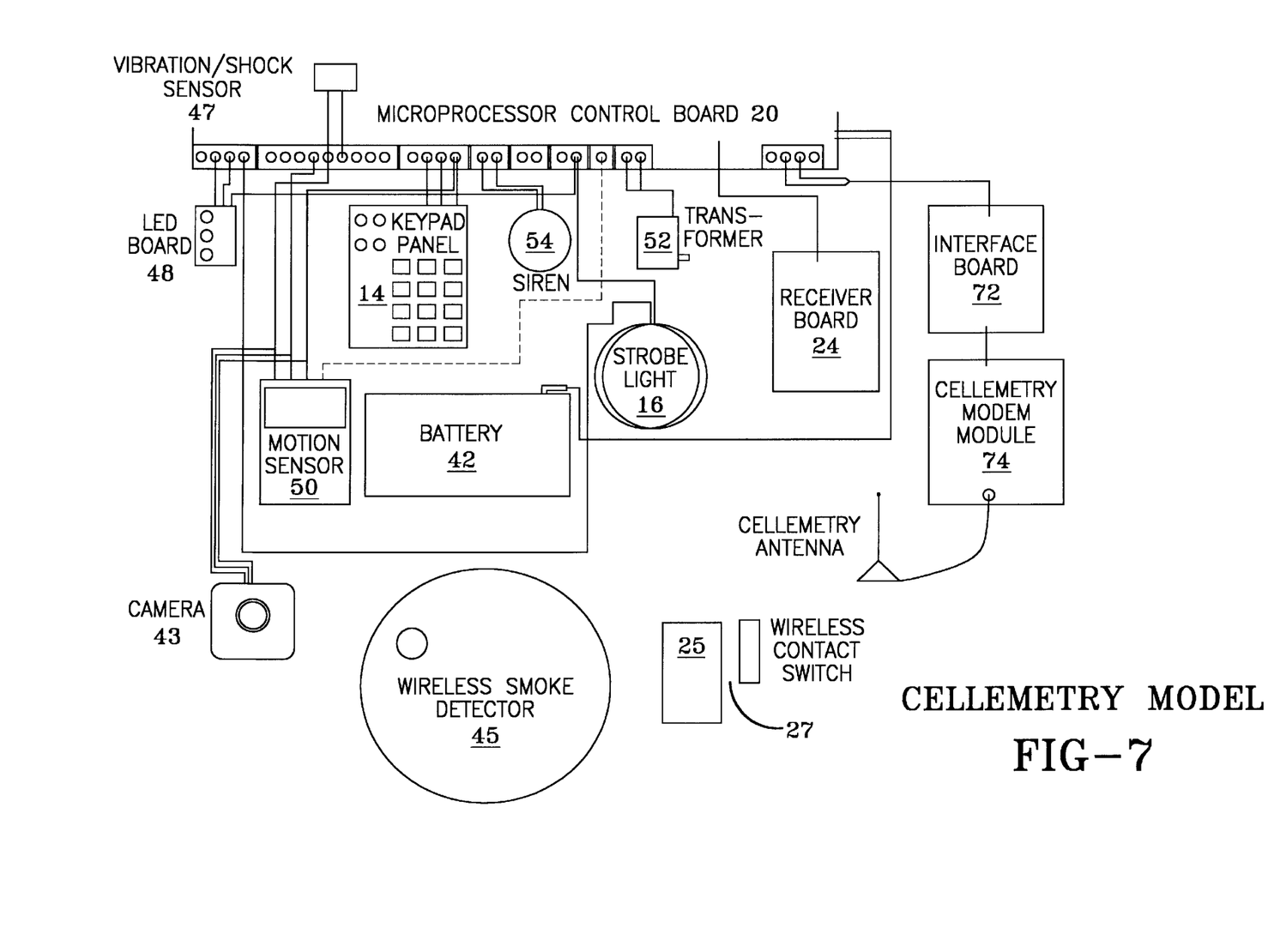
FIG. 7 is another embodiment of a schematic of the present invention interfaced with Cellemetry functionality.

FIG. 7 illustrates another embodiment of the portable alarm system 10 of the present invention. The system 10 is preferably comprised of a microprocessor board 20, an LED board 48, a keypad panel 14, a battery 42, a strobe light 16, a wireless receiver 24, a siren 54, a motion sensor 50, an interface board 72, and a Cellemetry Modem Module 74. The cellular communication means may be actuated to place a primary function phone call via the cellular voice channels when the control channel is in use, for example. A digital circuit which monitors the busy idle bit of the cellular data stream, for example, may determine the control channel is being used by its regular cellular customers (e.g. busy) which then turns to actuate the cellular communication means which actuates a primary function call to the remote security station.

Accordingly, the cellular call will be made to the remote station regardless of heavy activity on the control channel.

The cellular communication means may also be used in a conventional manner, e.g. voice channel for phone calls, as discussed previously.

Utilizing the Cellemetry Modem Module 74 allows significant cost savings for the user of the portable alarm system 10. With Cellemetry, calls are calculated by the number of messages sent and not by the typical cellular monthly charge (that would be incurred regardless of whether the system was used or not). Accordingly, the owner of the portable alarm system 10 would only incur costs for each time the unit makes a phone call; as opposed to incurring expensive monthly charges for traditional cellular service. Additionally, since Cellemetry utilizes radio waves and digital data control channels, service is reliable and offers advantageous spectral efficiency. Additionally, radio interference is further decreased since the control channels are reused at greater distances as compared to voice channels. This feature also allows for increased mobility of the portable alarm system 10.

A vibration/shock sensor 47 may be electrically connected to the control board. When the apparatus 10 is moved by an intruder, the sensor 47 actuates the alarm functions described herein (e.g., siren, strobo, etc.) and actuates the means for making a call to a monitoring station.

Figure 8:
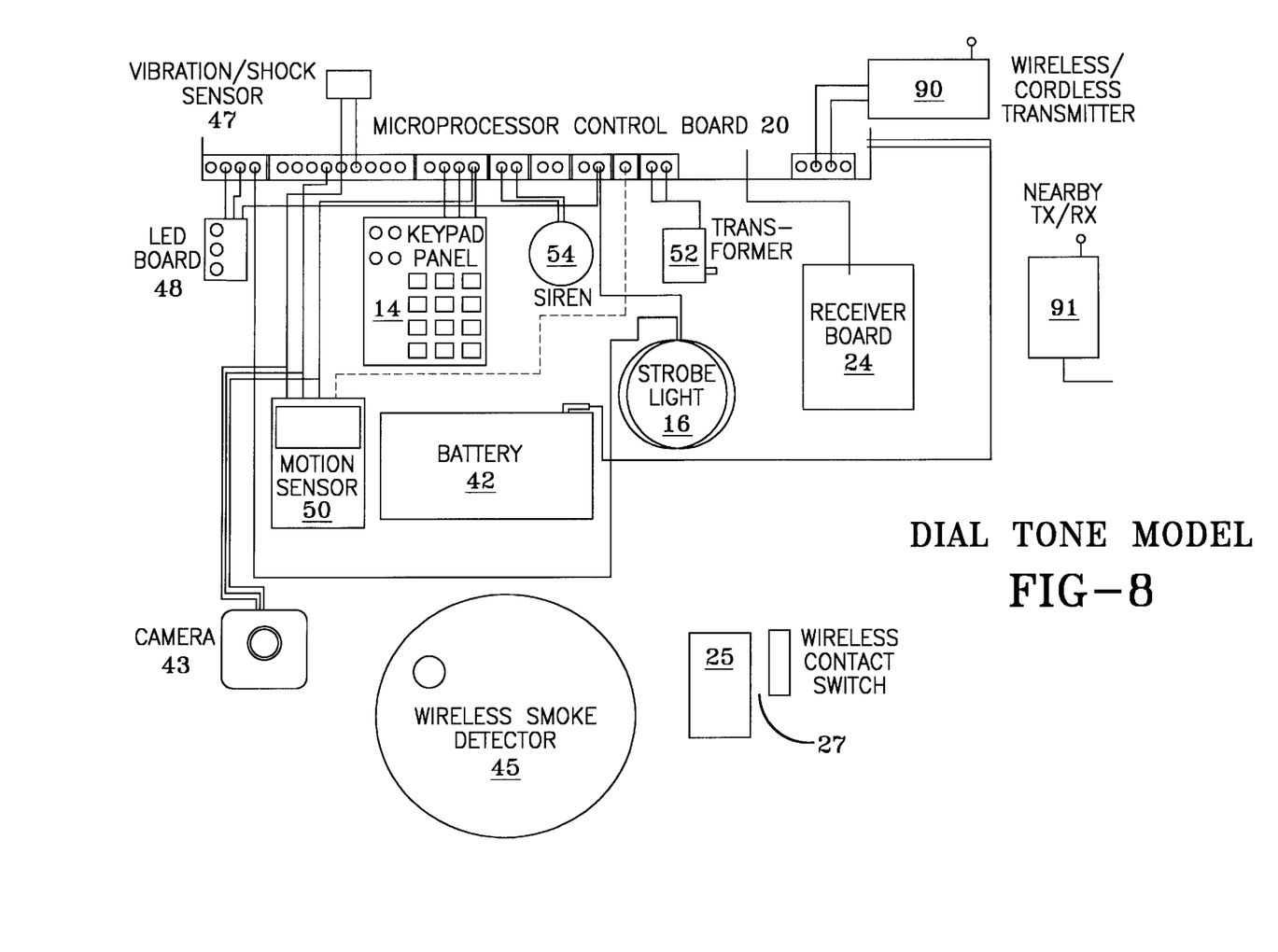
FIG. 8 is a schematic of yet another preferred embodiment of a landline functionality of the present invention.

FIG. 8 illustrates an example of a wireless/cordless dial tone embodiment of the present invention. As illustrated, the phone outputs of the microprocessor 20 are connected to a wireless/cordless transmitter 90. The transmitter 90 receives the alarm reporting information from the microprocessor control board 20. The alarm reporting information is changed to and sent wirelessly/cordlessly (one way alarm data protocol) to the remote transmitter/receiver 91 in a nearby location (e.g., another room or floor of the residence or a neighboring residence). The remote transmitter/receiver 91 stores the alarm data protocol and send it via the nearby telephone line to the alarm monitoring station. A vibration/shock sensor 47 may be electrically connected to the control board. When the apparatus 10 is moved by an intruder, the sensor 47 actuates the alarm functions described herein (e.g., siren, strobo, etc.) and actuates the means for making a call to a monitoring station.

Figure 9:
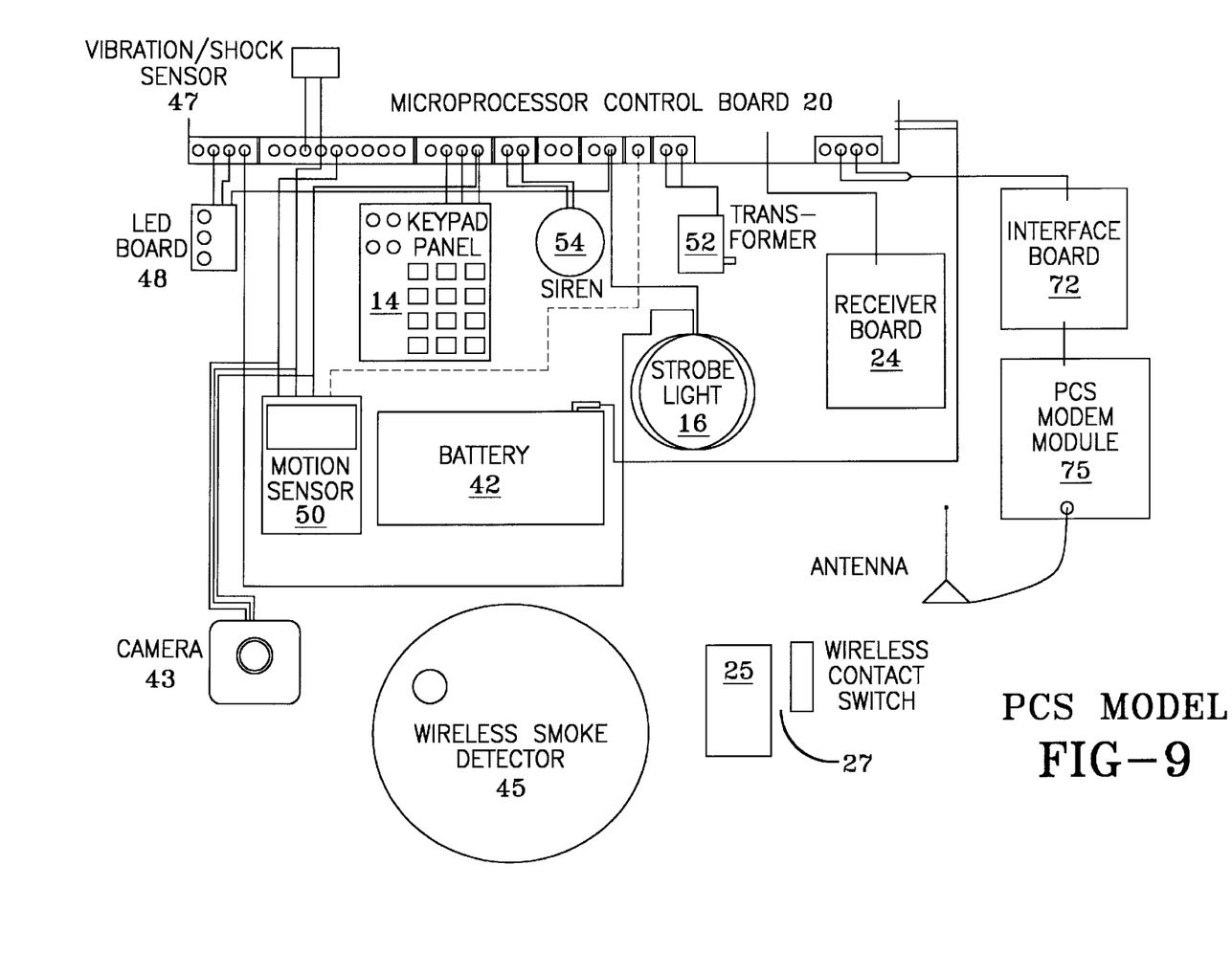
FIG. 9 is a schematic of another preferred embodiment of a PCS application of the present invention.

FIG. 9 illustrates one embodiment of a PCS unit of the present invention. The electrical schematic shown in FIG. 9 is substantially similar to FIG. 7 with the exception of a PCS modem module 75. A vibration/shock sensor 47 may be electrically connected to the control board. When the apparatus 10 is moved by an intruder, the sensor 47 actuates the alarm functions described herein (e.g., siren, strobo, etc.) and actuates the means for making a call to a monitoring station.

Figure 4:
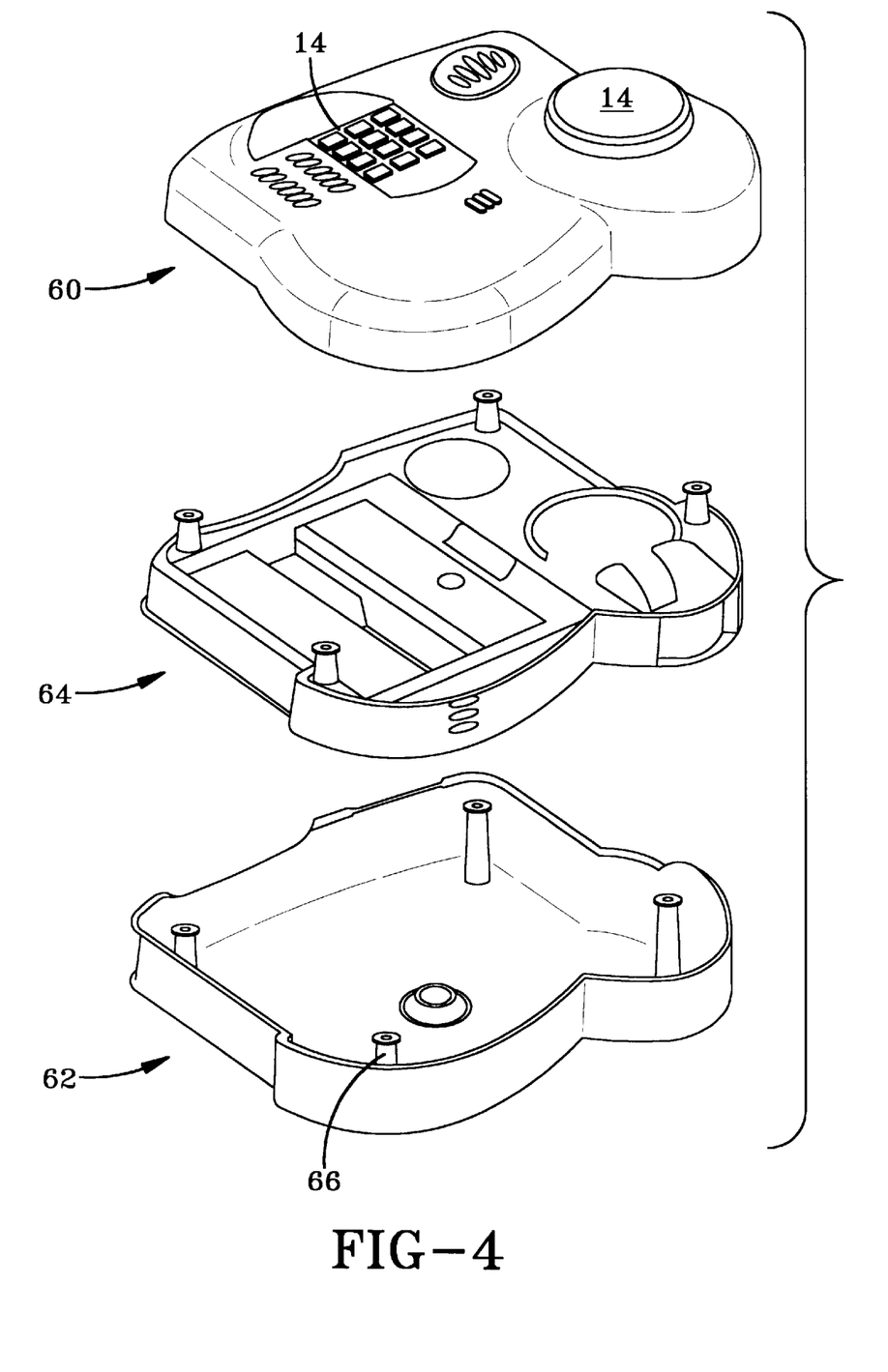
FIG. 4 is an exploded view of a preferred he shock-proof enclosure of the present invention.

FIG. 4 is an exploded view of the shock-proof enclosure 12 of the present invention. The enclosure 12 is preferably formed from a shock-proof plastic material although other materials may also work well. A preferred material for the enclosure 12 is a shatter-proof polycarbonate/ABS that is resistant to attempts to destroy it by throwing, kicking, or jumping on it. An illegal intruder may attempt to disable the apparatus of the present invention when the audio siren 54 sounds. With the enclosure 12 made of a material that resists impacts, the alarm may continue to sound and eventually cause the intruder to abandon efforts to disable it. The plastic may be formed into its desired shape by known processes such as blow molding or injection molding. The enclosure 12 of the present invention is also preferably formed of a unique ribbed construction which is explained in further detail below.

The enclosure 12 is preferably comprised of a lid exterior 60 and a bottom exterior 62, and a body portion 64. The body 64 fits between the lid exterior 60 and the bottom exterior 62. The construction insulates the components of the alarm system 10 from shock. In the preferred embodiment, the top lid 60 is a single piece injection molded plastic construction. The same is true of the body 64 and the bottom 62. The microprocessor 20 and other electronic components are placed within the body 64 protecting the components from potential impact. The body 64 and lid 60 may be bolted to the bottom 62 by bolts 66.

The alarm system 10 of the present invention provides an efficient, inexpensive, and flexible portable alarm system which preferably contains wireless cellular technology that may be used to protect residences, temporary apartments, hotel rooms, campgrounds, cabins, boats, and virtually any other area which may need to be secured.

The vibration/shock sensing device 47 allows the actuation of the alarm and/or actuation of dial-up procedures upon the displacement/shock of the alarm system by the burglar/intruder. Such a device may be obtained commercially from Directed Electronics, Inc. in California, part number MD500. This feature may for example, be used where a burglar attempts to smash or break the alarm system to prevent operation. In one embodiment a mercury vibration sensing device is placed in communication with the processing system of the present invention. In one embodiment, the sensor may be connected to the processing system inputs as described for the motion sensor 50. The mercury sensor may be placed in parallel with the other motion sensor 50 so that both sensors may be used in conjunction with each other. In another embodiment, the mercury sensor may be connected to other available input ports of the alarm processing system.

The mercury sensor detects displacement of the alarm unit from a normal fixed position (determined by calibrating the sensor). Upon sufficient displacement, the sensor sends a signal to the alarm processing board 20 which is programmed to initiate security dial-up and/or actuate alarm signals. The mercury sensing device may be used in conjunction with the wireless dial-tone transmission capability to actuate and allow progression of a call to a remote security station regardless of the condition or operability of the alarm unit itself.

FIG. 8 illustrates one embodiment of the wireless/cordless dial-tone transmission capability of the present invention. The transmitter/receiver, the transmitter 90 and the line seizure device within the transmitter/receiver 91 work in conjunction to provide wireless/cordless dial-tone transmission. The transmission between the transmitter/receiver 91 and the transmitter 90 occurs without any physically connected lines. The line seizure device within the transmitter/receiver 91 captures the dial-tone and enables the call to be sent from a different location than where the alarm system itself is located. The remote transmitter/receiver 91 may be located in a predetermined location in the building or unit to be secured or even in another location (e.g., the neighbor's house).

The wireless/cordless dial-tone transmission capability allows the unit to separate the dial-tone and alarm signal transmission functions from the alarm unit. Thus, the remote transmitter/receiver 91 for transmitting the alarm signals may continue to function despite any attempts to disable the alarm unit itself (e.g., throwing it against the wall). The transmitter 90 may be a cordless telephone handset board in communication with the microprocessor 20 to receive DTMF signals. The transmitter may then transmit the telephone number and data to the receiver/transmitter 91 which may be similar in many respects to a cordless phone base unit. The receiver/transmitter 91 may be conventionally powered through a standard residential electrical outlet and connected to a landline via, for example, a standard residential telephone landline wall jack. When the receiver/transmitter 91 receives the data from the transmitter 90, it is adapted to store the data received, and even if the communication connection with the transmitter 90 is severed, the receiver/transmitter 91 is adapted to dial out to the monitoring station and thereby deliver the needed alarm data.

Although preferred embodiments of the present invention have been described above, the present invention is susceptible to several variations and implementations which take advantage of the technology described herein and which would fall under the scope of coverage granted hereby. The description contained herein is not to be considered as limiting the scope of the invention, but is offered as an example of how the present invention may be implemented.

What is claimed is:

1. A portable alarm system, comprising:
   a) a portable enclosure;
   b) a microprocessor secured within said enclosure;
   c) a wireless receiver adapted to receive an alarm signal from at least one zone at a structure being monitored, said wireless receiver secured within said enclosure and electrically connected to said microprocessor;
   d) a communications device in electrical communication with said microprocessor, said communications device adapted to initiate and complete a transmission when said receiver receives said signal, to a location apart from said structure; and
   e) a means for capturing dial-tone and transmitting said dial-tone to said communication device, said means for capturing dial-tone remotely located from said portable enclosure.

2. An alarm system according to claim 1, wherein said communications device is secured within said enclosure.

3. An alarm system according to claim 1, wherein said a means for capturing dial-tone and transmitting said dial-tone is comprised of a line seizure device and a transmitter.

4. An alarm system according to claim 1, wherein said communication device has a receiver for receiving signals from said means for capturing dial-tone.

5. A portable alarm system, comprising:
   a) a portable enclosure;
   b) a microprocess or secured within said enclosure;
   c) a wireless receiver adapted to receive an alarm signal from at least one zone at a structure being monitored, said wireless receiver in electrical communication with said microprocessor;
   d) a device physically remote from said portable enclosure for obtaining communication to a remote security station; and
   e) a cordless communications device in electrical communication with said microprocessor, said cordless communications device adapted to initiate a transmission when said receiver receives said alarm signal, to a location apart from said structure, said cordless communication device adapted for communicating with said device for obtaining communication with a remote security station;

wherein said device physically remote from said portable enclosure for obtaining communication to a remote security station allows an alarm call to be sent from a location remote from said portable enclosure.

6. An alarm system according to claim 5, wherein said device for obtaining communication with a remote security station is comprised of a line seizure unit for capturing dial-tone and a transmitter.

7. An alarm system according to claim 6, wherein said means for communicating with said device for obtaining communication with a remote security station is comprised of a receiver for accepting signals from said transmitter.

8. A portable alarm system, comprising:
   a) a portable enclosure;
   b) a microprocessor secured within said enclosure;
   c) an intruder detection device in electrical communication with said microprocessor;
   d) a transmission device physically remote from said portable enclosure for obtaining communication to a remote security station; and
   e) a wireless communications device in electrical communication with said microprocessor, said wireless communications device adapted to initiate a wireless transmission to said transmission device physically remote from said portable enclosure for obtaining communication with a remote security station;

wherein said transmission device physically remote from said portable enclosure for obtaining communication to a remote security station is adapted to establish a connection with a remote security station.

9. A portable alarm system according to claim 8, wherein said transmission device physically remote from said portable establishes a connection with said remote security station through a telephone landline.

10. A portable alarm system according to claim 8, wherein said wireless communications device transmits a telephone number of the remote security station to said transmission device physically remote from said portable; and wherein said transmission device is adapted to store the data received from the wireless communication device.

11. A portable alarm system according to claim 8, wherein said transmission device physically remote from said portable establishes a connection with said remote security station through a wireless transmission means.

* * * * *

UNITED STATES PATENT AND TRADEMARK OFFICE
CERTIFICATE OF CORRECTION

PATENT NO. : 6,049,273

DATED : April 11, 2000

INVENTOR(S) : Brian K. Hess

It is certified that error appears in the above-identified patent and that said Letters Patent is hereby corrected as shown below:

In column 11, line 46, please delete the words "microprocess or" and replace them with -- microprocessor --.

Signed and Sealed this

Fifteenth Day of May, 2001

Attest:

NICHOLAS P. GODICI

Attesting Officer     *Acting Director of the United States Patent and Trademark Office*